Dec. 12, 1961 R. W. DAMON ET AL 3,012,744
MOUNTING DEVICE
Filed July 18, 1957
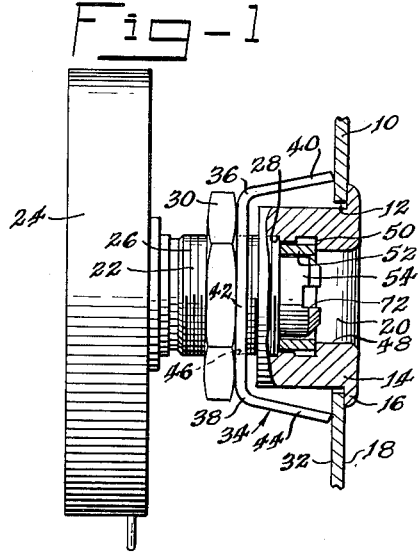
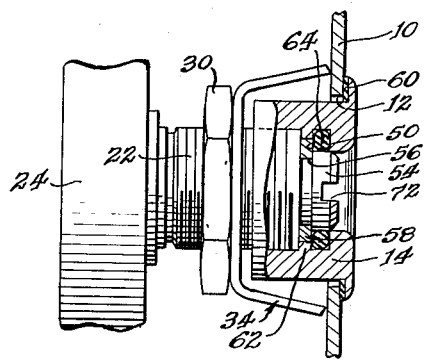
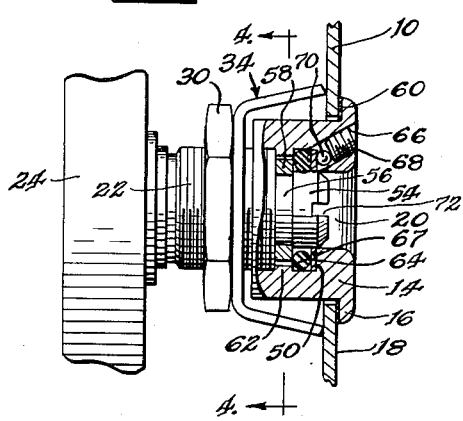
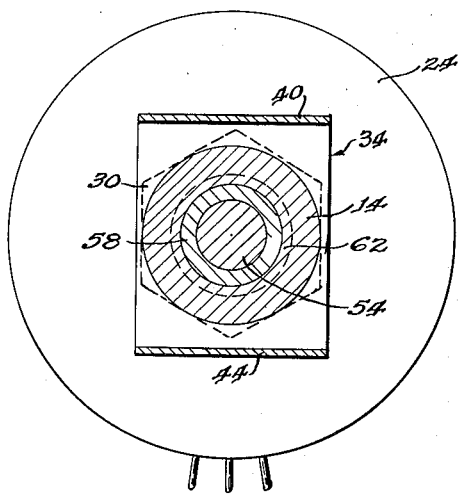
INVENTORS
Robert W. Damon
James William Sauber
Graf Nierman
& Burmeister
Attorneys

United States Patent Office 3,012,744
Patented Dec. 12, 1961

3,012,744
MOUNTING DEVICE
Robert W. Damon, West Concord, Mass., and James William Sauber, Cleveland, Ohio, assignors to Waters Manufacturing, Inc., Wayland, Mass., a corporation of Massachusetts
Filed July 18, 1957, Ser. No. 672,672
9 Claims. (Cl. 248—27)

The present invention relates to devices for mounting shaft-adjustable elements to a support structure, particularly control elements for electrical circuits which employ shafts for rotational control.

Many manufactured items are controlled by a rotatable shaft extending through an aperture in a wall or panel of the device. This is particularly true of electronic equipment. If the control device is to be frequently adjusted, a knob is generally secured to the end of the shaft; however, if the control device requires infrequent adjustment, the end of the shaft is provided with a screwdriver slot or some other convenient contour which will accommodate a wrench. For controls of this latter type, it is generally desirable that the rotatable shaft terminate at a point slightly behind the wall or panel of the device, so that it will not be exposed.

In numerous application electronic control elements such as potentiometers and other variable impedance components, and even switches, it is desirable to employ "recessed" mounting of the element, in which the entire component, including its shaft, is mounted behind the front panel or similar portion of the housing, access for purposes of adjustment being obtained through an aperture in this housing portion, so that the shaft does not extend outwardly from the housing. This general type of mounting is fairly common in the case of components which are not normally adjusted in operation by the user of the equipment so constructed, but requiring access for purposes of "trimming" operations in routine or other servicing. Such recessed mounting, however, is sometimes used for other purposes, as where projection from the front of the housing may not be employed because of safety or similar reasons. In general, no mountings of this type, used for recessed mounting with the panel or other housing portion serving as support, employ constructions such as offset brackets secured to the rear surface of the panel, the control device or element itself being mounted on such a bracket in essentially the same manner as it would otherwise be mounted on the panel itself. Such an installation requires a number of independent steps in assembly. In addition, it is poorly suited for front-panel use, because of the unfinished appearance of the aperture, unless it is provided with an additional "snap-in" or other type bushing or liner, thus again adding further cost and complexity. In certain applications, it is also desirable that the access aperture be sealed against moisture and similar conditions, for which the recessed mountings in general use make no provision. Another desirable feature of such a mounting is the provision of a facility for locking the shaft in position after it has been set, thus making it unnecessary to rely upon a high-torque characteristic of the control element itself in assuring against change of adjustment due to vibration and similar causes.

It is the principal object of the present invention to provide mounting devices for potentiometers and similar control elements which are suitable for such recessed-type mounting, and overcome the objections or deficiencies in existing mounting devices for this purpose as set forth above.

This and additional objects of the present invention will become readily apparent upon a further reading of this disclosure, particularly when viewed in the light of the drawings, in which:

FIGURE 1 is a sectional view of a device constructed according to the teachings of the present invention illustrating a control element secured to an apertured wall;

FIGURE 2 is a sectional view of a modified device for mounting a control element with a rotatable shaft to a wall;

FIGURE 3 is a sectional view of still another modified device for mounting a control element to an apertured wall; and FIGURE 4 is a sectional view taken along the line 4—4 of FIGURE 3.

In the drawings, the wall or panel for mounting the control element is designated 10, and the panel 10 is provided with an aperture 12. A bushing 14 is disposed within the aperture 12, and the bushing 14 is provided with a flange 16 which extends outwardly therefrom and abuts the face surface 18 of the panel 10. The bushing 14 is provided with an axial channel 20, and the sleeve 22 of the control element 24 is secured within the axial channel 20. As illustrated, the sleeve 22 is provided with threads 26 on its outer surface which engage threads 28 on the surface of the channel 20 to secure the sleeve 22 to the bushing 14, although the sleeve may be secured to the bushing in some other conventional manner. A tightening adjustment member in the form of a nut 30 is adjustably mounted on the sleeve 22.

The front surface of the nut 30 abuts against a strip 34 preferably but not necessarily of resilient material which is provided with a pair of bends 36 and 38 to form three portions 40, 42 and 44, the forwardly extending end portions 40 and 44 being of equal length, and the transversely extending central portion 42 being provided with an aperture 46 of sufficient diameter to accommodate the sleeve 22 of the control element 24. In the illustrated embodiment the bends 36 and 38 form angles somewhat less than 90 degrees relative to the plane of the central portion 42, which is backed by the nut 30. As a result of this construction, transmission of the nut 30 toward the rear face 32 of the panel 10 presses the strip 34 forwardly and causes the leg portions 40 and 44 to be forced against the rear surface of the panel 10 and at the same time pulls the bushing 14 rearwardly, thus pulling the flange 16 of the bushing in contact with the front face 18 of the panel 10 to clamp the panel securely between the front edges of the bracket 34 and the flange 16.

As illustrated in FIGURE 1, the diameter of the front portion of the channel 20, this region being designated 48, is smaller than the diameter of the channel remote from the panel 10, thus forming a shoulder 50 on a plane parallel to the panel 10. An annular spacer 52 is disposed between the shoulder 50 and the end of the sleeve 22 of the control element 24, the spacer 52 being disposed about the shaft 54 of the control element 24.

In the embodiment illustrated in FIGURE 2, the shaft 54 of the control element 24 is provided with a groove 56 extending about its periphery adjacent to the end of the sleeve 22, and a retaining ring 58 is disposed within the groove 56 rotatably abutting the sleeve 22 to anchor the shaft 54 relative to the sleeve 22. The control element 24 is hermetically sealed to the panel 10 in the following manner. A flat annular gasket 60 is disposed between the flange 16 of the bushing 14 and the face 18 of the panel 10, thus sealing the joint between aperture 12 and the bushing 14. The channel 20 of the bushing 14 is provided with an inwardly extending annular ridge 62 parallel to the flange 16 and spaced from the shoulder 50. An O ring 64 is disposed in the groove thus formed between the ridge 62 and the shoulder 50, and the shaft 54 of the control element 24 is surrounded by the O ring 64. The ridge 62 extends into the channel 20 a lesser distance than the shoulder 50 to permit the retaining ring 58 of the control element to abut the O ring 64, and the sleeve 22 directly abuts the ridge 62. As a result of the retaining ring 58 abutting the O ring 64, the O ring becomes compressed and distorted within its groove when thus assembled to form an effective hermetical seal between the shaft 54 and the bushing 14, the abutment of the sleeve 22 against the ridge 62 acting as a stop limiting the pressure applied by the O ring against the shaft.

FIGURES 3 and 4 illustrate an embodiment incorporating a mechanism for locking the shaft 54 in position. A bore 66 extends from the shoulder 50 of the bushing through the face thereof, and is provided with threads. The inner end of the bore 66 confronts the O ring 64, and a rigid washer 67 is disposed in the channel 20 between the O ring 64 and the shoulder 50. A screw 68 is threadedly engaged within the bore 66, and a ball 70 is located between the screw 68 and the rigid washer 67. The bore 66 is disposed at an angle of approximately 45 degrees relative to the axis of the channel or bore 20, so that the compression exerted by the ball 70 and the screw 68 forces the O ring 64 firmly against the shaft 54 to hold it in position.

As illustrated in the figures, the shaft 54 is provided with a screwdriver slot 72 to engage a screwdriver for adjustment. However, it is to be understood that the shaft could equally accommodate a socket for a wrench, or other conventional type of tool.

It is to be noted that the shaft 54 of the control element 24 is recessed in the wall or panel 10, and that it is not necessary to fasten any brackets or the like to the rear surface 32 of the panel 10 in order to accomplish this end. To install the control element 24 upon the panel 10, it is merely necessary to insert the bushing 14 into the aperture 12 of the panel 10 from the face 18 thereof. Thereafter, the nut 30 is positioned on the sleeve 22 of the control element 24, and the strip 34 is also slid upon the sleeve 22. The sleeve 22 is then threadedly engaged within the channel 20 of the bushing 14, the control element being screwed firmly and tightly within the bushing. Thereafter, the nut 30 is rotated to press the strip 34 against the wall or panel 10 to firmly mount the control element 24 in place, in the manner described.

FIGURES 1 through 4 illustrate the control element in the form of a variable resistor, although it is to be understood that the control element could equally well be a variable capacitor, a switch, or any other device which is adapted to be mounted to a wall or panel and which employs a control shaft. Further, the figures illustrate a control element which employs a rotational shaft for adjustment, although it is again to be understood that many of the advantages of the present invention may be realized with a control element having a translatable shaft rather than one which is rotatable.

From the foregoing disclosure, those skilled in the art will readily devise many mounting devices which are intended to be within the spirit and scope of this invention but are not specifically described herein. It is therefore intended that the scope of the present invention be not limited by the foregoing disclosure but rather only by the appended claims.

The invention claimed is:

1. A mounting device for potentiometers and similar control elements having a shaft, said mounting device comprising a bushing having a flange on the forward end, the bushing being of internal dimension adopted to receive a control shaft, means operatively associated with the bushing for securing a control element rearward of the bushing with the shaft extending into the bushing, a rearwardly facing shoulder in the bushing, an annular sealing member seated on the shoulder, a first compression means to compress the sealing member uniformly against the shaft to seal the surface of the shaft against fluid flow, and a second compression means extending between the shoulder and the forward end of the bushing and operable from said forward end to selectively apply additional compression to the sealing member to lock and unlock the shaft.

2. The fastening device of claim 1 wherein the second compression means comprises a threaded aperture in the bushing extending rearwardly and radially inwardly from the front end of the bushing to the shoulder, and a screw in the aperture.

3. Apparatus comprising, in combination, an electrical control element having an operating shaft extending from an externally threaded sleeve and a nut on the sleeve, a substantially tubular bushing having a flange at the front end and an internally threaded rearward end receiving the end of the sleeve of the control element, and a clamping element disposed between the bushing and the nut and having an apertured portion surrounding the sleeve and portions extending equal lengths forwardly along the outside of the bushing, the flange and the forward ends of said extending portions being adapted to clamp a panel therebetween.

4. In a fastening device for recessed panel mounting of a control element of the type having a shaft protruding from a threaded sleeve and a nut on the sleeve a substantially tubular bushing of approximately uniform outer diameter open at both ends and having a flange at the front end constructed to engage the front of a panel and a clamping member having a back portion with an aperture of a size to closely surround the sleeve and portions extending forwardly from the back portion along the rear portion of the outside of the bushing to engage the rear of the panel, the longitudinally extending inner surface of the bushing being internally threaded at its inner end to receive the threaded end of the sleeve, so constructed that when the nut abuts against the outer end of the clamping member, the panel is clamped between the bushing and the sleeve and the shaft is operable from the front of the panel.

5. The fastening device of claim 4 wherein the forward extension of the extending portions of the clamping member is substantially equal to the length of the portion of the bushing rearward of the flange, so that the fastening device may be employed with a variety of panel thicknesses.

6. The fastening device of claim 4 wherein the interior of the bushing has an inwardly extending shoulder forward of the threaded portion and there are included an inner annular resilient sealing member seated on the shoulder and an outer annular resilient sealing member seated against the flange, so that the threading of the sleeve into the bushing compresses the inner sealing member and tightening of the nut compresses the outer sealing member to seal both the interior and exterior of the fastening device against fluid flow.

7. The fastening device of claim 6 having an aperture extending rearwardly and inwardly from the forward end of the bushing to the shoulder, and externally operable compression means seated in the aperture to lock the shaft of the control element by additional compression of the sealing member.

8. The fastening device of claim 4 wherein the clamping member comprises a unitary substantially U-shaped strip.

9. The fastening device of claim 4 having an aperture extending rearwardly and inwardly from the forward end of the bushing to the interior of the bushing, and locking means within the bushing operable from the front end of the aperture to selectively lock and unlock a shaft within the bushing.

References Cited in the file of this patent

UNITED STATES PATENTS

| | | |
|---|---|---|
| 2,250,231 | Nodine | July 22, 1941 |
| 2,398,041 | Russell | Apr. 9, 1946 |
| 2,646,958 | Coykendall | July 28, 1953 |

(Other references on following page)

UNITED STATES PATENTS

| | | |
|---|---|---|
| 2,652,269 | Dunlap | Sept. 15, 1953 |
| 2,667,200 | Bedford | Jan. 26, 1954 |
| 2,670,226 | Becker | Feb. 23, 1954 |
| 2,766,955 | Dallimonti | Oct. 16, 1956 |
| 2,828,161 | Whitney | Mar. 25, 1958 |
| 2,859,930 | Brunsting et al. | Nov. 11, 1958 |

FOREIGN PATENTS

| | | |
|---|---|---|
| 153,605 | Australia | Oct. 13, 1953 |
| 539,158 | France | Mar. 29, 1922 |
| 775,536 | France | Oct. 15, 1934 |
| 1,101,259 | France | Apr. 20, 1955 |